(12) United States Patent
Shetty et al.

(10) Patent No.: US 11,880,295 B2
(45) Date of Patent: *Jan. 23, 2024

(54) WEB SERVICE TEST AND ANALYSIS PLATFORM

(71) Applicant: salesforce.com, inc., San Francisco, CA (US)

(72) Inventors: Arjun Shetty, San Jose, CA (US); Sandeep Bansal, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/521,565

(22) Filed: Nov. 8, 2021

(65) Prior Publication Data
US 2022/0066912 A1   Mar. 3, 2022

Related U.S. Application Data

(63) Continuation of application No. 16/743,775, filed on Jan. 15, 2020, now Pat. No. 11,169,907.

(51) Int. Cl.
*G06F 11/36* (2006.01)
(52) U.S. Cl.
CPC ...... *G06F 11/3664* (2013.01); *G06F 11/3696* (2013.01)
(58) Field of Classification Search
USPC ........................................................ 717/125
See application file for complete search history.

(56) References Cited

U.S. PATENT DOCUMENTS

| 5,781,720 | A | 7/1998 | Parker et al. |
| 6,408,403 | B1 | 6/2002 | Rodrigues et al. |
| 6,859,922 | B1 | 2/2005 | Baker et al. |
| 7,490,319 | B2 | 2/2009 | Blackwell et al. |

(Continued)

OTHER PUBLICATIONS

"AppPerfect™ Load Test v10.5.0 User Guide"; AppPerfect.com website [full url in ref.]; 2016 [IDS entry] (Year: 2016).*

(Continued)

*Primary Examiner* — Qing Chen
*Assistant Examiner* — Clint Thatcher
(74) *Attorney, Agent, or Firm* — Kowert, Hood, Munyon, Rankin & Goetzel, P.C.; Scott W. Pape; Dean M. Munyon

(57) ABSTRACT

A method for testing a web service is disclosed, the method including testing, by a testing application executing on a client computing system, a web service running at least partially on a server computing system. The testing includes directing a web browser of the client computing system to simulate user interaction with the web service to perform a particular operation that includes a particular set of sub-operations. The directing includes issuing one or more requests to perform the particular set of sub-operations. The testing also includes recording test information based on responses received from the web service in response to performing the particular set of sub-operations. The test information includes latency information for at least one of the sub-operations of the particular set. The method also includes presenting, by the client computing system, a user interface having a graphical element depicting an analysis of the recorded test information.

20 Claims, 12 Drawing Sheets

(56) References Cited

U.S. PATENT DOCUMENTS

| | | | | | |
|---|---|---|---|---|---|
| 8,904,353 | B1* | 12/2014 | Arguelles | | G06F 11/3672 |
| | | | | | 717/124 |
| 10,135,709 | B1 | 11/2018 | Segel et al. | | |
| 10,579,507 | B1 | 3/2020 | Lounibos et al. | | |
| 10,915,437 | B1 | 2/2021 | Arguelles et al. | | |
| 2003/0074606 | A1* | 4/2003 | Boker | | G06F 11/3414 |
| | | | | | 714/E11.193 |
| 2004/0243338 | A1* | 12/2004 | Sabiers | | G06F 11/3495 |
| | | | | | 714/E11.202 |
| 2009/0055522 | A1* | 2/2009 | Shen | | G06F 11/3433 |
| | | | | | 709/224 |
| 2009/0089039 | A1* | 4/2009 | Shufer | | G06F 11/3664 |
| | | | | | 703/23 |
| 2009/0235172 | A1* | 9/2009 | Gandhi | | H04L 43/50 |
| | | | | | 702/108 |
| 2009/0240759 | A1* | 9/2009 | Miyamoto | | G06F 11/3419 |
| | | | | | 709/201 |
| 2012/0017156 | A1* | 1/2012 | Broda | | G06F 11/3419 |
| | | | | | 709/224 |
| 2012/0059919 | A1* | 3/2012 | Glaser | | G06F 11/3664 |
| | | | | | 709/223 |
| 2013/0104106 | A1 | 4/2013 | Brown et al. | | |
| 2014/0129915 | A1* | 5/2014 | Segal | | G06F 11/3676 |
| | | | | | 715/230 |
| 2016/0314064 | A1 | 10/2016 | Moretto et al. | | |
| 2017/0046254 | A1 | 2/2017 | Buege | | |
| 2017/0180238 | A1* | 6/2017 | Telle | | G06F 11/3664 |

OTHER PUBLICATIONS

Andrew Comeau; "How To Create a Dynamic Search Filter on a Microsoft Access Form"; Comeausoftware.com website [full url in ref.]; Jan. 9, 2019, 2 pages.

"Report Load Tests Results for Test Comparisons or Trend Analysis"; Microsoft.com website [full url in ref.]; Oct. 19, 2016, 2 pages.

"App Perfect™ Load Test v10.5.0 User Guide"; App Perfect.com website [full url in ref.]; 2016, 136 pages.

Helgi Saddekow; "7 Things to Test In Your Search Form"; deviQA blog website [full url in ref.]; Mar. 20, 2019, 13 pages.

"Test Restful Services, Test Web Services"; AppPerfect.com website [full url in ref.]; as captured by the Wayback Machine Internet Archive (archive.org) on Oct. 4, 2019, 10 pages.

* cited by examiner

*Operations 500*

Login Operation 503 log.trace.start(tbegin) - sub-operation 530a
  receive.credentials(user) - sub-operation 530b
  validate(credentials) - sub-operation 530c
  log trace.stop(tend) - sub-operation 530d Navigate Operation 505 log trace.start(tbegin) - sub-operation 550a
  move.position(x,y) - sub-operation 550b
  detect.position(x,y) - sub-operation 550c
  activate.(object) - sub-operation 550d
  log trace.stop(tend) - sub-operation 550e Search Operation 507 log trace.start(tbegin) - sub-operation 570a
  type.term("abc") - sub-operation 570b
  choose.database(db) - sub-operation 570c
  send.term("abc",db) - sub-operation 570d
  log trace.stop(tend) - sub-operation 570e

*FIG. 5*

Test Information 140

Log 600a sub-operation 601a
test iteration 603a
request input 605a
response output 609a
request start time 613a
response time 617a Log 600b sub-operation 601b
test iteration 603b
request input 605b
response output 609b
secondary input 607b
secondary output 611b
request start time 613b
response time 617b

*FIG. 6*

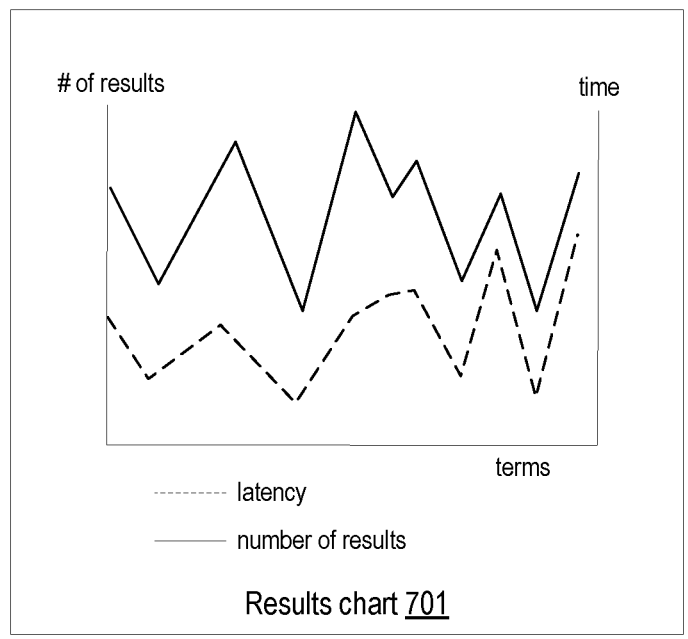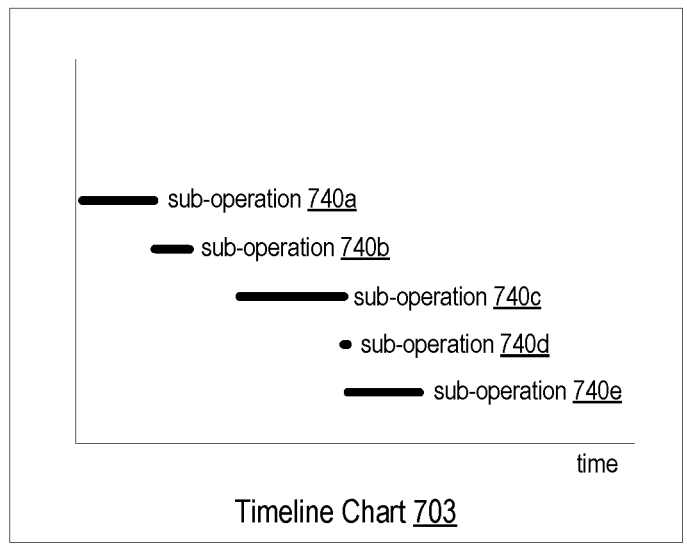
FIG. 7

WEB SERVICE TEST AND ANALYSIS PLATFORM

PRIORITY CLAIM

The present application is a continuation of U.S. application Ser. No. 16/743,775, filed Jan. 15, 2020 (now U.S. Pat. No. 11,169,907), which is incorporated by reference herein in its entirety.

BACKGROUND

Technical Field

This disclosure relates generally to testing of a server computer system, and more particularly to development of automated test applications for evaluating performance of a web-based service hosted by a server computer system.

Description of the Related Art

Server computer systems, such as web servers, application servers, email servers, etc., provide various computing resources and services to an end user. Due to its online implementation, a web-based service (or simply web service) may be accessed by a vast number of users across the globe, using a variety of types of computer systems to gain this access. To minimize server downtime and/or a poor user experience, testing of a new web service may be performed. Such testing can include alpha and beta releases of the web service in which a limited number of user are granted access to the new web service. Alpha and beta testers may be selected based on their level of expertise and willingness to use a service that may include unknown bugs. Use of alpha and beta testers can provide a variety of "real-world" input and use cases for evaluating performance of the new web service, without exposing a wide user base to a potentially flawed service. One drawback of alpha and beta testing is that the input generated for the web service is not fully controlled and may be difficult to replicate when a bug fix is implemented and needs to be validated.

BRIEF DESCRIPTION OF THE DRAWINGS

FIG. 5 is a block diagram depicting components of a test application, according to some embodiments.

FIG. 6 is a block diagram depicting components of test information recorded by the test application, according to some embodiments.

FIG. 7 includes two examples of graphical elements used in a user interface to display test information recorded by a test application.

DETAILED DESCRIPTION

Testing of a new web service may include providing various inputs into the web service in order to validate one or more functions that are provided by the web service. Alpha and beta testing by a variety of users can provide a large variety of use cases for evaluating performance of the functions of the new web service. A lack of control over alpha and beta users can, however, result in a particular feature not being utilized, or may omit a particular combination of input that might expose a particular type of bug. In addition, the uncontrolled environment of alpha and beta testing can cause difficulty in replicating a particular sequence of input that triggers a particular bug. When a fix for a discovered bug is implemented, replicating the particular sequence of input can validate whether the fix is successful or not.

Furthermore, a developer may desire to compare performance of a new web service to that of an existing similar web service. The developer may also desire to compare results between different implementations of the new web service. For example, the developer may wish to compare latencies and results for two different implementations of a component that accesses a third-party database. Such an analysis allows the developer to select an implementation that provides more accurate results and/or completes the task in less time. While alpha and beta testing may provide a wide variety of test input for the new web service, details of each user request may not be captured at a level that allows the developer to determine a particular component that causes a particular performance issue or a particular task that may be improved. Techniques are proposed for generating a wide variety of test inputs that can be monitored at a detailed level and can be repeated as desired to perform comparisons between a number of implementations.

Embodiments for testing a web service are disclosed herein. One such embodiment includes testing, by a testing application executing on a client computing system, a web service running on a server computing system. The testing includes directing a web browser of the client computing system to simulate user interaction with the web service to perform an operation that includes a set of sub-operations, and recording test information based on responses received from the web service in response to performing the set of sub-operations. Directing the web browser includes issuing one or more requests that causes the web service to perform the set of sub-operations. The test information includes, for example, latency information for at least one of the sub-operations. The client computing system presents a user interface having a graphical element depicting an analysis of the recorded test information.

Figure 1:
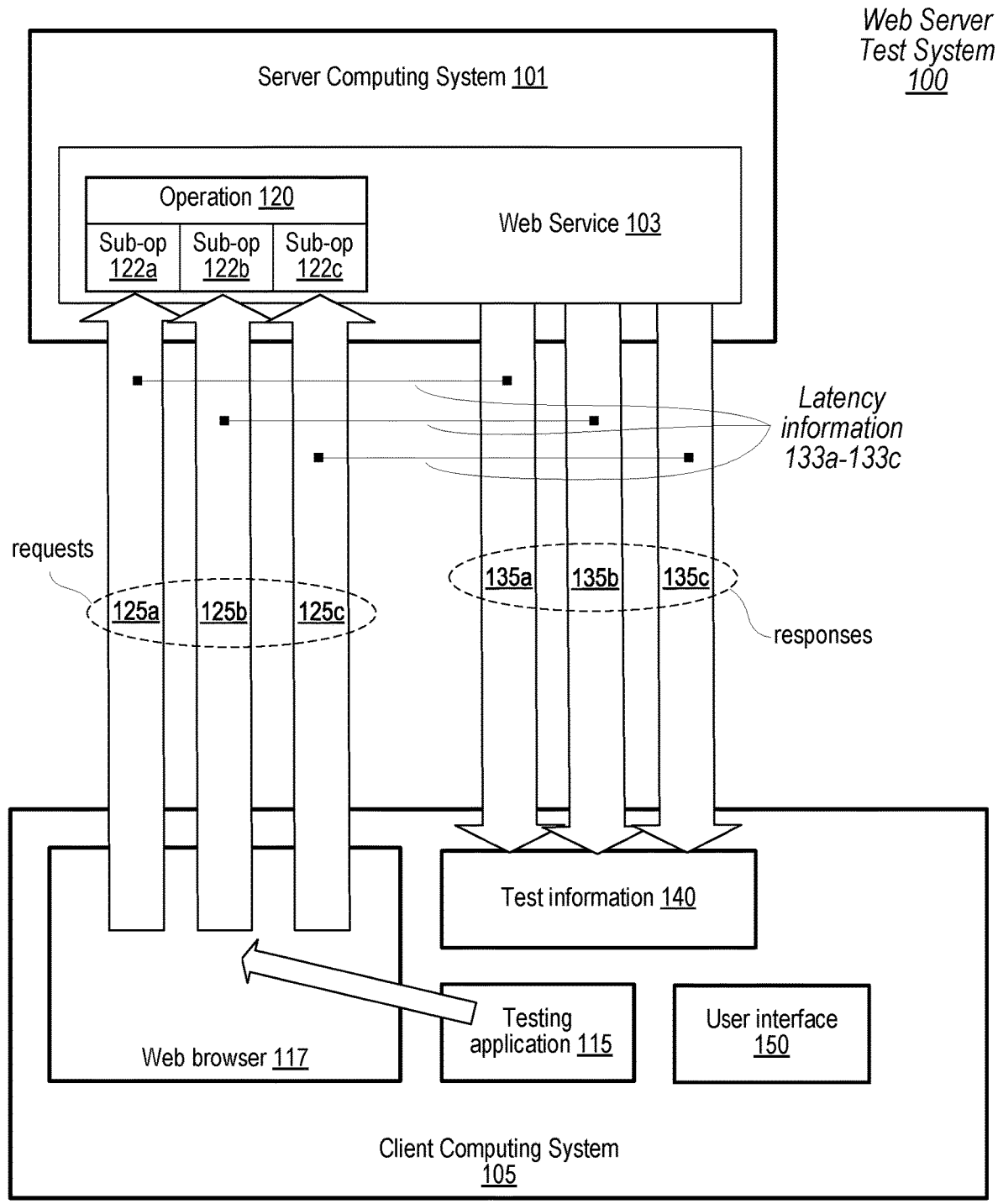
FIG. 1 is a block diagram illustrating an example web server test system for evaluating a web service hosted by a server computing system, according to some embodiments.

An example system for testing a web server is illustrated in FIG. 1. Web server test system 100 includes client computing system 105 which is used to test web service 103 that is hosted by server computing system 101. Web service 103 is any suitable web-based function such as cloud computing, online shopping, financial services, search engines, and the like. Client computing system 105 includes software and hardware for implementing testing application 115, web browser 117, and user interface 150. Client computing system 105 also includes memory for collecting test information 140. Client computing system 105 is coupled to server computing system 101 via any suitable communication interface, for example, ethernet, universal serial bus (USB), WiFi, or combination thereof.

To evaluate web service 103, testing application 115, executing on a client computing system 105, tests web service 103 running on server computing system 101. The testing is initiated by a test engineer, a program developer, a quality control expert, or the like. In some embodiments, testing application 115 is initiated by another application, such as a scheduling application or a batch process. The testing is implemented, for example, to identify program bugs, and/or opportunities to improve performance of web service 103. The testing includes directing web browser 117 of client computing system 105 to simulate user interaction with the web service to perform operation 120 that includes a set of sub-operations 122a-122c. The directing includes issuing one or more requests 125a-125c that causes the web service 103 to perform sub-operations 122a-122c.

In one example, web service 103 includes a search engine and operation 120 is a web search using a portion of a search term. Sub-operations 122a-122c include: entering the portion of the search term into a dialog box; sending the portion of the search term to one or more search databases; and collecting search results from each of the one or more search databases. In some embodiments, a library of operations and corresponding sub-operations may be maintained on client computing system 105 or in a separate database that is accessible by client computing system 105. Testing application 115 retrieves an operation from the library, including associated sub-operations to be performed by web service 103.

Continuing with this example, a program developer may wish to determine how well the search engine performs when receiving only a portion of a search term. As part of the testing, the program developer may repeat the web search operation by repeating the sub-operations, including: entering an increased portion of the search term into the dialog box; sending the increased portion of the search term to the search database; and collecting additional search results from the search database. These additional results can be compared to the previously recorded test results to determine how the performance of the search engine varies when using the increased portion of the search term.

As shown, the testing also includes recording test information 140 based on responses 135a-135c received from web service 103 in response to performing sub-operations 122a-122c. Test information 140 includes latency information 133a-133c for at least one of the sub-operations, for example, latency information 133a-133c. For example, if request 125a includes entering login information for a particular user account on web service 103, then testing application 115 may record latency information 133a, corresponding to an amount of time taken by web service 103 to send response 135a. As another example, if request 125b includes entering information into one or more fields in a web page, then testing application 115 may record latency information 133b, corresponding to an amount of time taken by web service 103 to send response 135b.

After recording test information 140, a database of test results is available for software developers or other interested parties to reference. In some embodiments, client computing system 105 presents user interface 150 having a graphical element depicting an analysis of the recorded test information 140. User interface 150 may be presented on client computing system 105 or on a different computing system with access to the database. A user accessing the test result database may select various options for user interface 150 to, for example, display results for a particular iteration of a performed test, display an average or other statistics over multiple test iterations, or display a comparison between two or more test iterations.

In one example, web service 103 is a search engine and test application 115 is used to test performance of the search engine. The tested performance characteristics may include a latency for responding with search results after a search term is entered, a number of results that the search engine returns, and/or an accuracy or relevancy of the results to the search term. Multiple test iterations may be performed using a variety of search terms, including searching with a different portion of a search term for each iteration. A user can access user interface 150 to display various analyses of the test iterations, such as how long the search engine takes to return results for a different portion of a given search term and how accurate the results are for each portion. Using such a test application and user interface to collect and display test information may allow developers of a web service to identify system bugs and other issues that may be specific to a particular type of input and then to validate a fix by retesting a new version of the web service under the same conditions. Use of the disclosed test application and user interface may also allow developers to refine the web service to improve response times and/or results by highlighting a particular sub-operation that has a performance level with room for improvement.

It is noted that the web server test system of FIG. 1 is merely an example to demonstrate disclosed concepts. In other embodiments, the functional components may be different and/or located in different computing systems. For example, the test application, web browser, test information, and user interface are shown as being located within a same computing system. In other embodiments, any one or more of these components may be distributed to other computing systems within a communications network. The testing application is described as directing a web browser to issue the requests to the web service. It is, however, contemplated that the testing application may, in some embodiments, issue the requests directly, without use of an intervening web browser.

The test system disclosed in FIG. 1 shows a web service that is implemented on a server computing system. Web services may be implemented using various techniques, which may result in use of different testing procedures. Two examples of web services, and procedures for testing them, are described below in regards to FIGS. 2 and 3.

Figure 2:
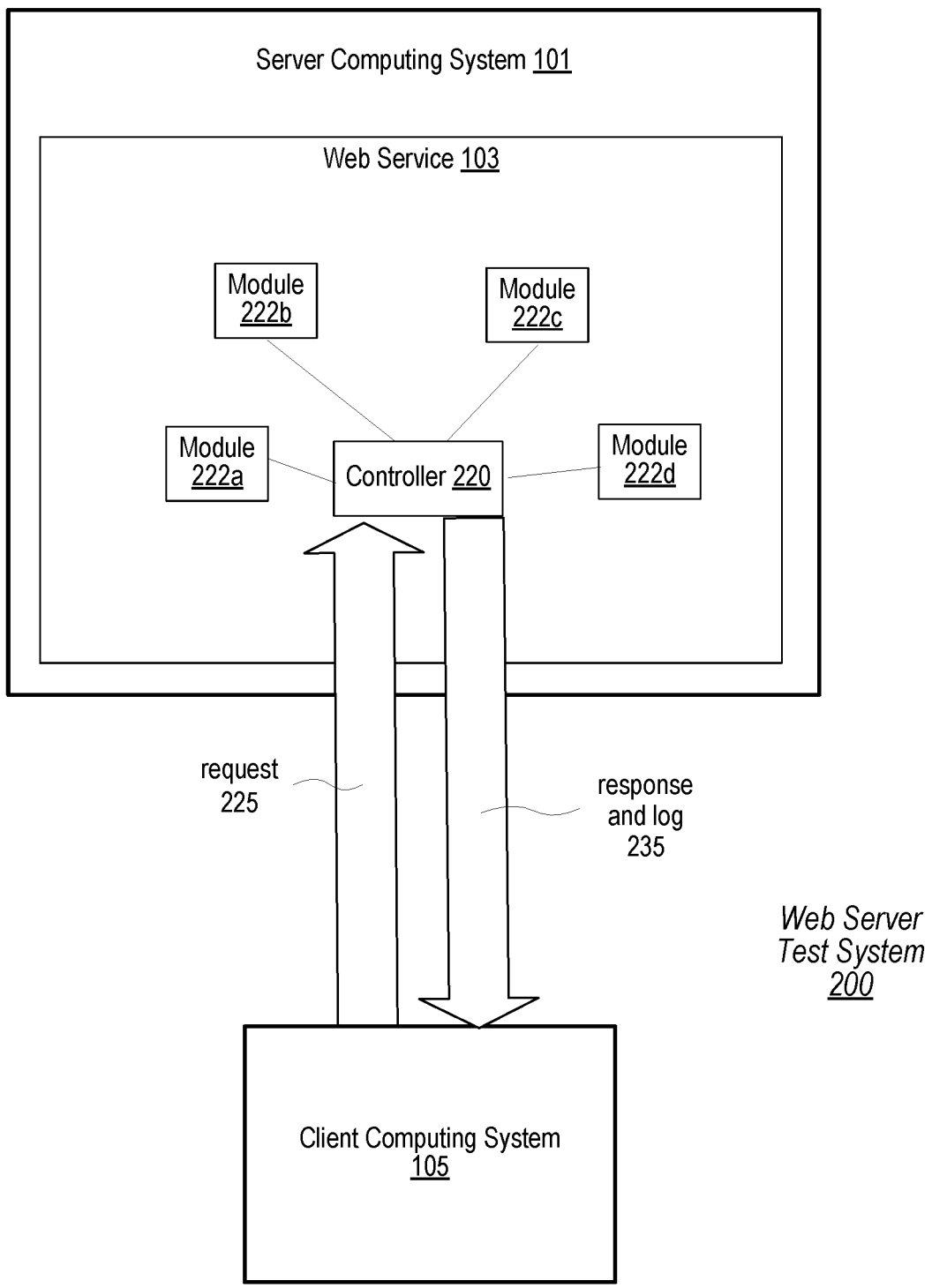
FIG. 2 is a block diagram showing an embodiment of a web server test system in which a web service is implemented on a server computing system.

Moving to FIG. 2, another embodiment of a web server test system is shown. Similar to web server test system 100, web server test system 200 includes web service 103 implemented on server computing system 101. Client computing system 105 is coupled to server computing system and is used to test web service 103. As shown, web service 103 includes controller 220 and modules 222a-222d.

As illustrated, client computing system 105 sends requests 225 to test web service 103. Web service 103 utilizes controller 220 to receive request 225. Controller 220 uses one or more of modules 222*a*-222*d* to complete request 225. Modules 222*a*-222*d* may perform one or more sub-operations corresponding to request 225. As part of the testing of web service 103, it may be desirable to obtain information regarding each sub-operation performed. Some sub-operations, however, may be performed within server computing system 101, thereby preventing client computing system 105 from having visibility into the performance of these sub-operations. Instead, client computing system 105 may only be capable of determining latency information from when request 225 is sent to when a corresponding response is sent by server computing system 101. Test data, in such a case, may be limited to the response and the determined latency for receiving the response.

To increase visibility into sub-operations that are performed within server computing system 101, controller 220 includes a test mode that enables logging of test information associated with one or more sub-operations performed within server computing system 101. When a response is ready to be sent to client computer system 105, controller 220 sends logged data with the response. A testing application running on client computer system 105, therefore, receives response and log 235 from web service 103 that includes latency information logged by the server computer system.

In some embodiments, controller 220 is implemented as a test mode controller module that is invoked in place of a production controller module when testing is to be performed. In other embodiments, controller 220 is a production controller module that includes additional test logging capabilities that are enabled when testing is to be performed. At the beginning of a test session, client computing system 105 may send an initial request to server computing system 101 to indicate that testing is to be performed on web service 103, and thereby allow client computing system 105 to gather an increased amount of test information as compared to a web service that does not include such a test mode.

Figure 3:
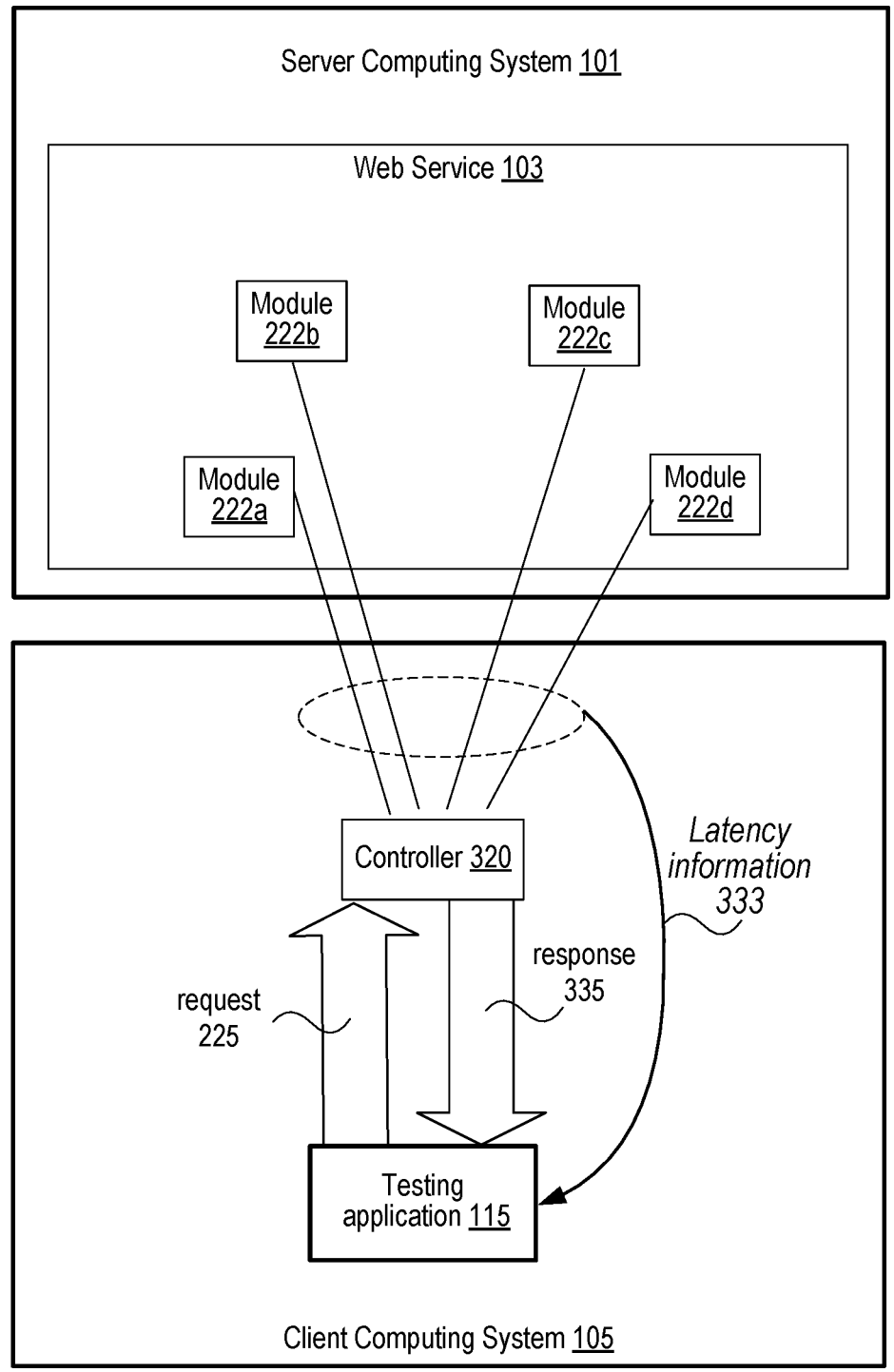
FIG. 3 is a block diagram showing an embodiment of a web server test system in which a web service is implemented partially on a server computing system and partially on a client computing system.

Another procedure for gathering an increased amount of test information is depicted in FIG. 3. Web server test system 300 is another embodiment for testing web service 103. In web server test system 300, web service 103 is implemented partially on server computing system 101 and partially on client computing system 105. As illustrated, web service 103 includes modules 222*a*-222*d* implemented on server computing system 101, as well as controller 320 implemented on client computer system 105.

To use web service 103 in the illustrated embodiment, server computing system 101 copies code for implementing controller 320 to client computing system 105. In some embodiments, controller 320 is copied in response to a program installation operation prior to a first use of web service 103 by client computing system 105. In such cases, the code for controller 320 is stored in non-volatile memory and accessed when web service 103 is to be used by client computing system 105. In other embodiments, server computing system 101 copies the code for controller 320 to client computing system 105 each time that client computing system 105 initiates a session with web service 103. For example, server computing system 101 may send code for controller 320 to client computing system 105 in response to a request to login to web service 103 from client computing system 105.

After code for controller 320 has been copied to client computing system 105, this portion of web service 103 is performed by client computing system 105 during testing of web service 103. As part of the testing, testing application 115 sends request 225 to controller 320. Controller 320 utilizes one or more of modules 222*a*-22*d* to perform request 225. Since controller 320 is performed by the same computing system as testing application 115, test application 115 has access to information exchanged between controller 320 and modules 222*a*-222*d*. To determine latency information 333, for example, test application 115 records latency information using information sent and received by the portion of the web service performed by client computer system 105. As shown, controller 320 may not log test information, and may therefore send result 335 to testing application 115 without an associated log.

It is noted that FIGS. 2 and 3 are merely examples. In other embodiments, the web service may have a portions distributed differently from the illustrated embodiments. For example, in some embodiments, code for one or more modules of the web service may be performed by the client computing system in addition to, or in place of the controller module.

In the preceding figures, a testing application is described for testing performance of a web service. Testing applications may be implemented in a variety of fashions. An example of elements associated with a particular testing application are shown in FIG. 4.

Figure 4:
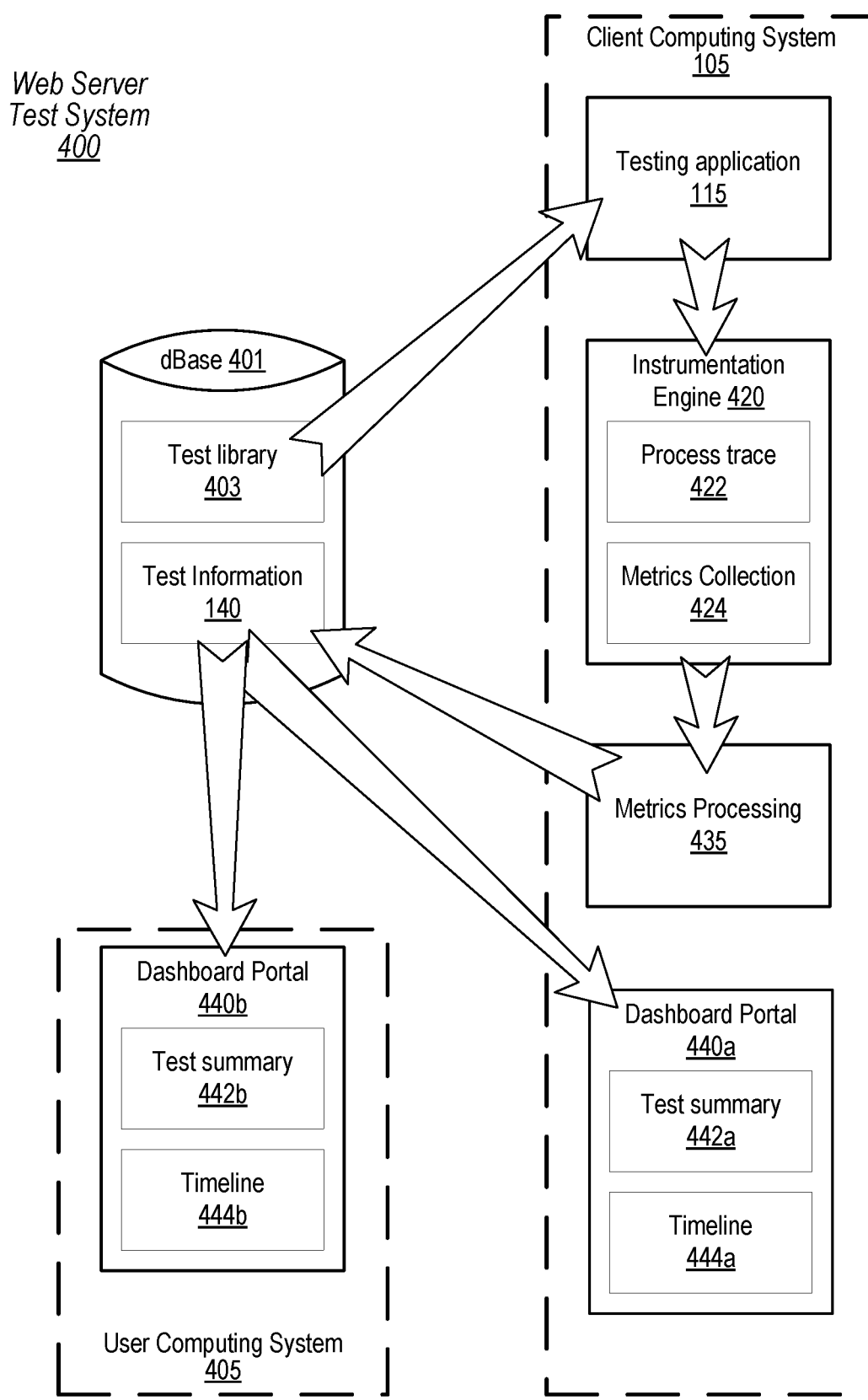
FIG. 4 is a block diagram showing an example process flow for a test application running in a web server test system, according to some embodiments.

Turning to FIG. 4, a portion of another web server test system is illustrated. Web server test system 400 includes client computing system 105, database 401, and (optionally) user computing system 405. Client computing system 105 includes testing application 115 as well as other modules used for testing and analyzing collected test results, such as instrumentation engine 420, metrics processing 435, and dashboard portal 440*a*. Database 401 stores test library 403 and test information 140. User computer system 405 includes dashboard portal 440*b*.

To perform one or more test iterations of a web service such as web service 103 in FIGS. 1-3, testing application 115 is launched on client computer system 105. In the illustrated embodiment, testing application 115 is configured to initiate performance of one or more operations on the web service being tested. Testing application 115 retrieves an operation from test library 403, the selected operation including a particular set of sub-operations. One or more requests associated with each sub-operation to be performed are also retrieved from test library 403. The requests are sent to instrumentation engine 420 which, in turn, prepares a particular request to be sent to the web service, initializes a count value for determining latency information, and opens a log for collecting metrics associated with the request. In response to an indication of a start time, instrumentation engine 420 issues one or more requests to perform the particular set of sub-operations, the one or more requests simulating particular user inputs into the web service operated on a server computing system. Process trace 422 tracks latency information based on the start time indication.

Metrics collection 424 receives, from the web service, a series of responses associated with the particular set of operations, such as search results for a search operation or a login approval for a login operation. In addition, metrics collection 424 may receive other test information associated with the performance of the particular set of sub-operations, for example, indications of a particular search database that is used by the web service to determine search results. Latency information from process trace 422 and the test information from metrics collection 424 are sent to metrics processing 435. Metrics processing 435 determines, based on the indicated start time, latency information for the series of responses. Furthermore, metrics processing 435 indexes the determined latency information with an identifier for the corresponding sub-operation and a value indicative of an iteration for performing the operation, as well as other received test information corresponding to the sub-operation. The indexed test results, including the series of responses, the determined latency information, the identifier and the value indicative of the iteration, are stored as test information 140 in database 401.

To review the collected test information 140, a user interface having a graphical element depicting an analysis of the received series of responses and the latency information is presented on client computing system 105. Dashboard portal 440a is an example of such a user interface. Users with appropriate access to test information 140 may access and display one or more graphical elements based on test information 140 by using client computer system 105 or any other computing system with a dashboard portal, such as user computing system 405 with dashboard portal 440b. Using dashboard portal 440b, analyses of test information 140, such as test summary 442b and timeline 444b may be displayed and reviewed to, for example, determine a strategy for making enhancements to the web service that was tested.

It is noted that the embodiment of FIG. 4 is an example for demonstrating the disclosed concepts. The various modules shown in the client computer system may differ in other embodiments. For example, in another embodiment, the process trace module may be included as part of the testing application and the metrics collection may be included with the metrics processing. In other embodiments, all processes may be included in a single testing application.

In the descriptions related to FIGS. 1-4, a testing application is described as initiating performance of operations and sub-operations by a web service. The performed operations may include a variety types of tasks. The types of tasks will depend on a functionality of the web service being tested.

Proceeding to FIG. 5, several operations and associated sub-operations are shown. Operations 500 illustrates three operations: login operation 503, navigate operation 505, and search operation 507. As illustrated, these operations are used by testing application 115 to test web service 103. Each of these operations 500 further includes a respective set of sub-operations that, combined, perform the associated operation. Login operation 503 includes sub-operations 530a-530d (collectively sub-operations 530), navigate operation 505 includes sub-operations 550a-550e (collectively sub-operations 550), and search operation 507 includes sub-operations 570a-570e (collectively sub-operations 570).

Each set of sub-operations may include one or more sub-operations for simulating user input in the web browser and one or more sub-operations for processing the user input to generate the responses. For example, login operation 503 simulates a user logging into a corresponding user account. Sub-operation 530b simulates account credentials being sent by a user to web service 103. Sub-operation 530c initiates a validation, by web service 103, of the received credentials.

In a similar manner, navigate operation 505 includes sub-operation 550b to move a cursor to position (x,y) within a user interface of web service 103. Sub-operation 550b, therefore, corresponds to a simulation of user input sent to web service 103. Sub-operations 550c and 550d, detect a current position of the cursor and then activates an option that is associated with the detected position, for example, a rendered button of the user interface or selection of a dialog box in the user interface. Accordingly, sub-operations 550c and 550d are performed in response to the simulated user input as part of web service 103.

In embodiments in which web service 103 includes a search engine, search operation 507 can be performed to simulate a search for a term or a portion of a term. The search term may be selected using various methods, for example, by using a randomly generated value to select a search term from a list of search terms, or by selecting, in order, from the list of search terms. Sub-operation 570b simulates a user typing in the search term to send to web service 103. Sub-operation 570c is performed by web service 103 to select one or more databases from which to search for the selected term, and after the selection of one or more databases is made, the search term is sent. Search operation 507 may be repeated a number of times, using a different portion of the selected search term for each iteration. For example, the search term may first be sent to web service 103 using the first three letters of the term, and then repeated with the portion of the search term increased by a letter for each iteration. Repeating search operation 507 thusly may allow a programmer to evaluate a speed and accuracy with which web service 103 is able to return search results based on the size of the search term.

All three of operations 500 include sub-operations for starting and stopping a log trace. As illustrated, sub-operations 530a, 550a, and 570a, signal both test application 115 and web service 103 to track times and results associated with subsequently performed sub-operations. Latencies for performing each sub-operation as well as a latency for performing the complete operation may be tracked. Sub-operations 530d, 550e, and 570e, signal an end to logging test information for the current operation being tested.

It is noted that the operations described in reference to FIG. 5 are merely examples. Various other operations may be used as part of a testing application for testing a web service. For example, other operations may include payment operations may be used for financial or shopping web services, and web page navigation operations may be used for testing web services that include a plurality of links. In addition, the sub-operations described above not intended to be a comprehensive list of sub-operations associated with the described operations. A login operation, for example, may include sub-operations for testing a forgotten password option.

FIG. 5 depicts several operations that may be tested in a web service. Various tested operations may produce different amounts of test information. Some operations, such as the navigate operation described above, may produce little or no results. In such cases, latency information may be the only test information that is captured. Other operations, such as a search operation, may return many results in the form of links to items corresponding to the search term. In addition to latency information, the returned links may be captured as test information and used to make a determination of an accuracy of a particular search operation. The latency and other results from a test operation may be captured in log files.

Moving now to FIG. 6, an example of logged test information is illustrated. Test information 140 is shown with two log files, logs 600a and 600b. Logs 600a and 600b may, in some embodiments, correspond to test information associated with performances of login operation 503 or search operation 507.

Test information 140 includes logged information corresponding to sets of sub-operations performed by web service 103 in response to request generated by testing application 115. As shown, the logged information includes logs 600a and 600b. Logs 600a and 600b are indexed test results created by indexing determined latency information with an identifier for a corresponding one of the particular set of sub-operations and a value indicative of an iteration for performing the particular set of sub-operations.

Each of logs 600a and 600b correspond to one iteration of one operation included in testing application 115. For example, log 600a may correspond to one of sub-operations 570a-570e of search operation 507 in FIG. 5. Log 600a includes six pieces of data. Sub-operation 601a is an identifier for the corresponding sub-operation (e.g., sub-operation 570b). This identifier may be a name or other alphanumeric value assigned to the sub-operation. Test iteration 603a is a value indicative of an iteration for performing the operation. The iteration may be a value tracked by client computing system 105 and incremented each time testing application 115 is performed, or may be a value entered by a user of client computing system 105 when initiating testing application 115. Request input 605a identifies input used for the corresponding iteration of the sub-operation, e.g., the search term ('abc') used for sub-operation 570b in FIG. 5. Response output 609a is related to any data or status that may be returned by web service 103 as a result of the performance of sub-operation 570b, such as an acknowledgement from web service 103 that the search term was received without errors. Request start time 613a is a time stamp, a count value, or other type of indication of when sub-operation 570b was initiated. Response time 617a is a value indicating an amount of time that has elapsed between request start time 613a and when response output 609a is received, also referred to herein as a "latency" for performing sub-operation 570b. In other embodiments, response time 617a may be another time stamp indicating when response output 609a is received, in which case latency information may be determined using request start time 613a and response time 617a.

Logged information for different sub-operations may include different amounts of information. For example, log 600a includes six logged data items, while log 600b includes eight different logged data items. Log 600b, for example, corresponds to sub-operation 570d of FIG. 5. The logged data items in log 600b include similar items as found in log 600a. In addition, log 600b includes the additional data items of secondary input 607b and secondary output 611b. Secondary input corresponds to additional input used by web service 103 to perform sub-operation 570d. If request input 605b corresponds to the search term "abc," then secondary input 607b corresponds to a selected data base, "db." In a similar manner, secondary output 611b corresponds to additional results returned by sub-operation 570d after response output 609b. For example, response output 609b may correspond to a first result of a search performed for sub-operation 570d, and logged as response output 609b. A second result of the search is logged as secondary output 611b. Subsequent search results of a series of results may be logged as third, fourth, and fifth outputs, and so forth until all results are captured and logged.

Client computing system 105 stores indexed test results, including the series of responses, the determined latency information, the identifier and the value indicative of the iteration into a database. Logs 600a and 600b, for example, may be stored into database 401 (FIG. 4) or other storage location that is accessible to users authorized to review the test information.

It is noted that the test information shown in FIG. 6 is one example for demonstrating the disclosed concepts. In other embodiments, any suitable number of logs may be generated and stored. Log files may include any suitable amount of data for reviewing performance of a web service.

The log files shown in FIG. 6 include information that may be useful for a developer or test engineer to evaluate how a tested web service performs, or to compare the web service to older versions or to other similar web services. To review the logged data, a user interface may be utilized to present the logged data as a graphical element, such as a chart, to the user. Several examples of graphical elements are shown below in FIGS. 7 and 8.

Turning now to FIG. 7, two charts are shown depicting graphical elements for presenting logged data from one or more iterations of a web server test. As shown, results chart 701 is a line chart depicting information related to a number of search results returned in response to various search terms and a latency associated with receiving the results. The x-axis corresponds to various different search terms while one y-axis corresponds to a number of results returned for the search term and the other y-axis corresponds to a latency measured, for example, from when the respective search term is sent to the web service to when a final result is received by the client computing system. Timeline chart 703, as illustrated, presents a timeline in the form of a Gantt chart. The x-axis corresponds to time while the y-axis corresponds to various sub-operations of an operation.

As described above, a client computer system (e.g., client computing system 105) presents the user interface with a graphical element. To generate the graphical elements such as results chart 701 and timeline chart 703, client computing system 105 accesses data from the indexed test information 140. A user of client computing system 105 may utilize the user interface to select particular iterations of recorded test performances to analyze particular sub-operations and/or a particular set of test conditions or test input.

For example, the user may select a number of iterations of a search operation to generate results chart 701. Each of the selected iterations may correspond to use of a different search term, use of a different portion of a given search term, use of a different search database, testing of a different version of web service 103, or a combination thereof. In the illustrated example, a number of results from each iteration of the search operation is graphed with a corresponding latency value indicative of an amount of time web service 103 used to return the results after receiving the search term. Using a chart such as results chart 701, a user may determine how web service 103 performs search operations based on search terms, or how a new version of web service 103 compares to an older version.

Presenting the user interface with a graphical element may, in some embodiments, comprise generating, by a client computing system using recorded test information, a timeline indicating a respective start time and a respective stop time for each of a particular set of sub-operations. Timeline chart 703 is one example of such a timeline that may present results of one or more test iterations performed by client computing system 105 on web service 103. Each horizontal bar is indicative of a start time (left end of each bar) and a stop time (right end of each bar) for a corresponding one of sub-operations 740a-740e. Timeline chart 703 may further indicate dependencies between particular sub-operations 740a-740e based on a stop time of a first sub-operation (e.g., 740a) aligning with a start time of a second sub-operation (e.g., 740b). In addition, a gap between an end time of a particular sub-operation (740b) and a start time of a subsequent sub-operation (740c) may be indicative of, for example, a system delay in server computing system 101 of network traffic between server computing system 101 and a particular database. Although timeline chart 703 is shown in the form of a Gantt chart, other forms of presenting timelines are contemplated.

Figure 8:
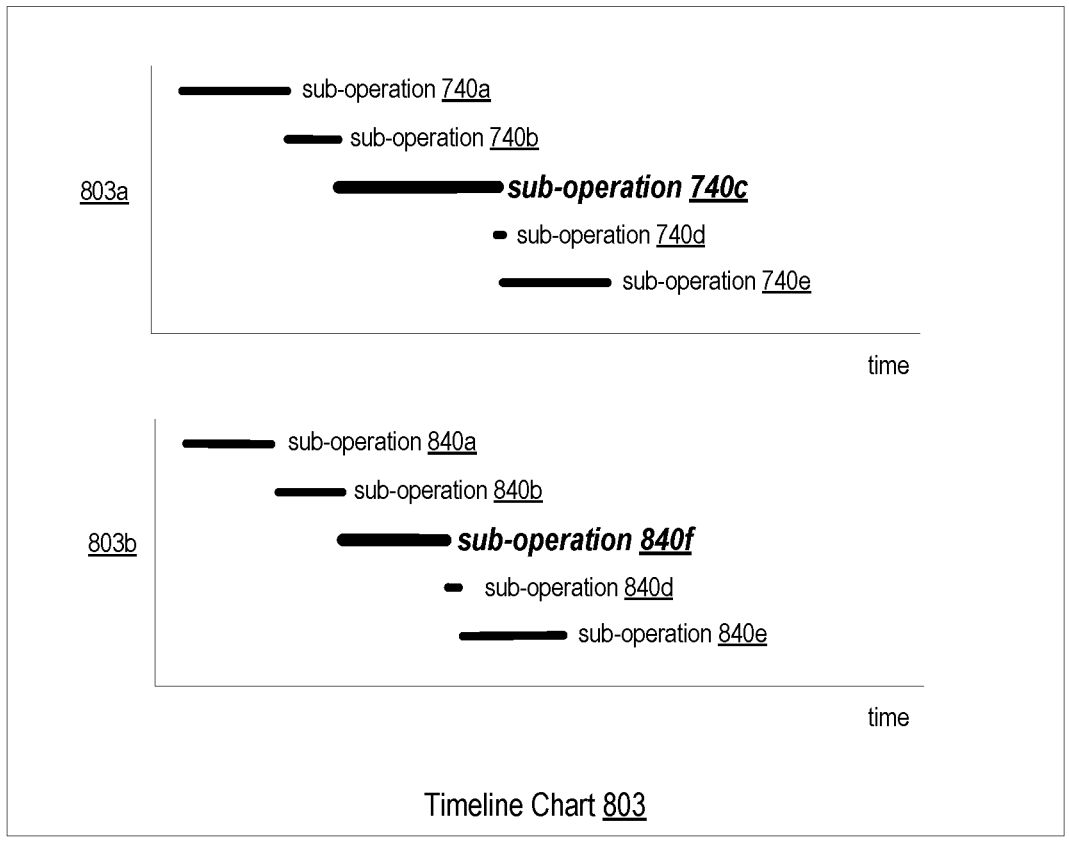
FIG. 8 illustrates an example of a graphical element of a user interface that displays test information from performances of multiple test iterations, according to some embodiments.

Proceeding now to FIG. 8, timeline chart 803 illustrates how the user interface may be used to compare test information from two test iterations. Timeline chart 803 includes two timelines, particular timeline 803*a* and different timeline 803*b*, each similar to timeline chart 703, and each one corresponding to a different set of test information 140. For example, particular timeline 803*a* may correspond to test information recorded for a performance of a particular operation before a code change is made to web service 103 and different timeline 803*b* corresponds to test information recorded after the code change is made and the performance of the operation is repeated. In other cases, one or more of sub-operations 740*a*-740*e* may be different from a corresponding one of sub-operations 840*a*-840*e*. In such cases, timelines 803*a* and 803*b* may highlight differences between the performance of a modified sub-operation as well as to other sub-operations that may be impacted by changes in the modified sub-operation.

As an example of modifying a sub-operation, a particular iteration of an operation that includes sub-operations 740*a*-740*e* is performed. Client computing system 105 presents a user interface having the graphical elements shown in FIG. 8. Presenting this user interface comprises generating, by client computing system 105 using indexed latency information, particular timeline 803*a* indicating a respective start time and a respective stop time for each of the particular set of sub-operations 740*a*-740*e* for a particular iteration of the performance of an operation. Sub-operation 740*c* is modified, creating sub-operation 840*f*. Client computing system 105 repeats performance of the operation using sub-operations 840*a*-840*e*. Client computing system 105 generates different timeline 803*b* indicating a respective start time and a respective stop time for each of the particular set of sub-operations 840*a*-840*e* for a different iteration of the performance of the operation. In this example, sub-operations 740*a*-740*e* correspond to sub-operations 840*a*-840*e*, with the exception of the modified sub-operation 840*f*. Client computing system 105 displays different timeline 803*b* on a same screen as particular timeline 803*a*, for a side-by-side comparison of results. In addition, client computing system 105 identifies start and stop times for one or more of the particular set of sub-operations that differs by a threshold amount between particular timeline 803*a* and different timeline 803*b*, and highlights these identified start and stop times in the graphical elements. As shown, a latency for sub-operation 840*f* is less than a latency for sub-operation 740*c*. This difference satisfies a threshold difference and the timeline bars for both sub-operations 740*c* and 840*f* are highlighted to emphasize this threshold difference.

As an example of modifying web service 103 between test iterations, client computer system 105 performs a particular operation, including sub-operations 740*a*-740*e* and records test information as has been described. After a revision has been made to program code included in web service 103, client computer system 105 repeats the performance of the particular operation, including sub-operations 840*a*-840*e*, on a revised version of the web service 103 and compares the recorded test information to test information corresponding to the revised version of the web service. In this example, sub-operations 740*a*-740*e* are the same as sub-operations 840*a*-840*e*. Presenting a user interface includes identifying performance differences between the prior version of web service 103 and the revised version of web service 103, and highlighting the identified differences in the graphical element, as shown by sub-operation 740*c* and 840*f*.

It is noted that the charts of FIGS. 7 and 8 demonstrate examples of the disclosed concepts. It is contemplated that test information collected from testing of a web service may be presented in a variety of fashions. The illustrated charts include line charts and timelines. Other formats may include pie charts, histograms, scatter plots, and any other suitable format for presenting test results.

The web service test systems described above in FIGS. 1-4 may perform test procedures using a variety of methods. Several such methods for performing tests of a web service are described below in combination with FIGS. 9-11.

Figure 9:
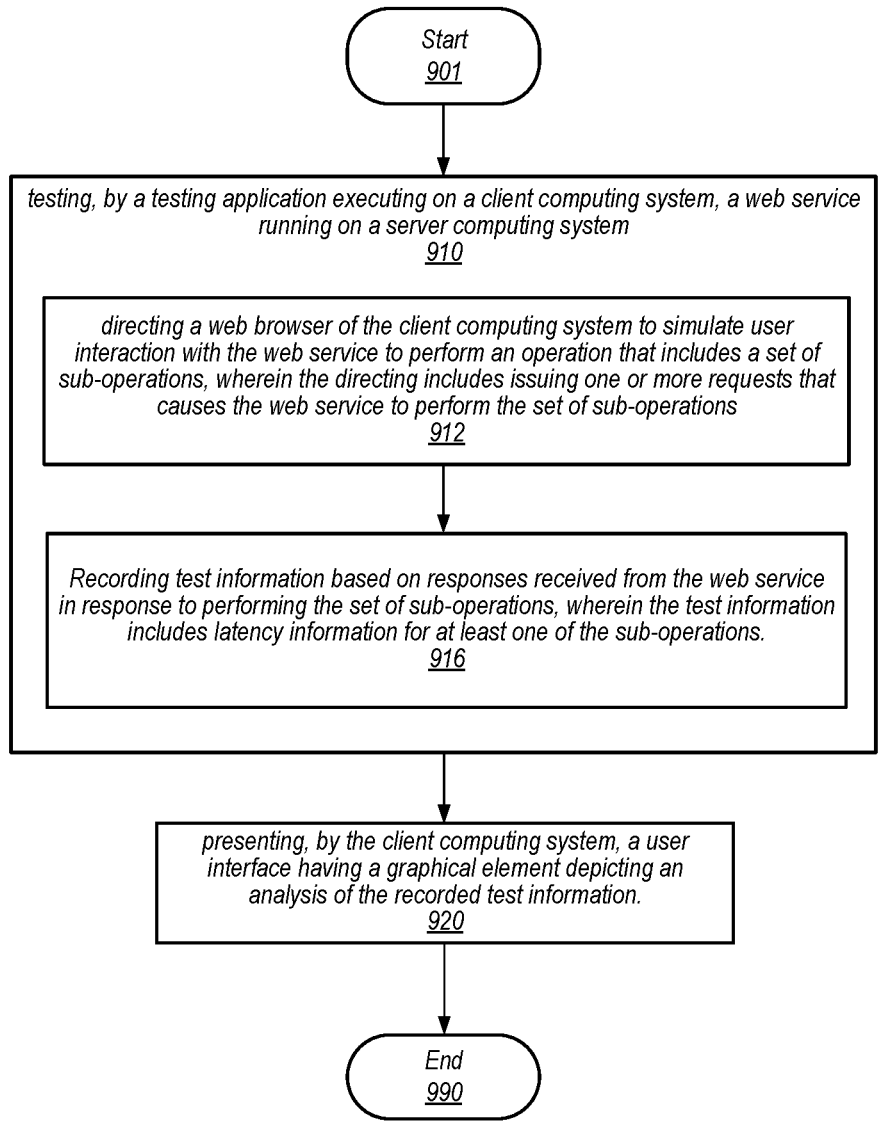
FIG. 9 is a flow diagram showing an example method for testing a web service, according to some embodiments.

Turning now to FIG. 9, a flow diagram illustrating an example method 900 for testing a web service is depicted, according to some embodiments. In various embodiments, method 900 may be performed by web server test system 100 of FIG. 1. For example, client computing system 105 may include (or have access to) a non-transitory, computer-readable medium having program instructions stored thereon that are executable by client computing system 105 to cause the operations described with reference to FIG. 9. Referring collectively to FIG. 1 and the flow diagram of FIG. 9, method 900 begins at block 901.

At block 910, method 900 includes, testing, by a testing application executing on a client computing system, a web service running at least partially on a server computing system. As shown in FIG. 1, testing application 115 executes on client computing system 105 to test web service 103 executing, at least partially, on server computing system 101. Web service 103 may be, for example, any suitable type of internet-based service such as a cloud computing service, a shopping web site, an internet search portal, and the like. Server computing system 101 and/or client computing system 105 may, in some embodiments, include more than one computing device with web service 103 or testing application 115 being implemented across multiple computing devices. In other embodiments, web service 103 and/or testing application 115 may be implemented on a single computing device.

Block 910 includes sub-blocks 912 and 916. At sub-block 912, the method includes directing a web browser of the client computing system to simulate user interaction with the web service to perform a particular operation that includes a particular set of sub-operations. The directing includes issuing one or more requests to perform the particular set of sub-operations. For example, in FIG. 1, testing application 115 directs web browser 117 to issue requests 125*a*-125*c*, each request corresponding to one of a particular set of sub-operations 122*a*-122*c* that are included in operation 120. The requests 125*a*-125*c* simulate user interaction with web service 103, without utilizing actual user activity. Such simulated interactions may allow for a testing procedure that is repeatable and traceable, thereby allowing a developer of web service 103 to evaluate various aspects of the performance of web service 103 to, for example, identify program bugs and/or identify areas for improvement or enhancement.

At sub-block 916, block 910 further includes recording test information based on responses received from the web service in response to performing the particular set of sub-operations. The test information includes latency information for at least one of the sub-operations of the particular set. Client computing system 105 receives responses 135*a*-135*c* from web service 103 and adds the received responses to test information 140. These responses include, for example, results from a search request, an acknowledgement of a successfully performed authentication, or other similar activity included in performing operation 120. A portion of test information 140 includes latency information 133a-133c. Latency information 133a-133c includes an indication of an amount of time from when one of requests 125a-125c is sent by client computing system 105, to when the corresponding response 135a-135c is received by client computing system 105. For example, latency information 133a indicates an amount of time from request 125a is sent to when response 135a is received.

Test information 140 includes indexed test results that are created, by client computing system 105, by indexing the determined latency information 133a-133c with an identifier for a corresponding one of the particular set of sub-operations 122a-122c and a value indicative of an iteration for performing the set of sub-operations. Client computing system 105 stores these indexed test results, including the series of responses, the determined latency information, the identifier and the value indicative of the iteration, into a database where test information 140 is maintained.

Method 900 also includes, at block 920, presenting, by the client computing system, a user interface having a graphical element depicting an analysis of the recorded test information. In the present embodiment, a user of client computing system 105, or a user of a different computing system that has access to test information 140, selects one or more iterations of performances of test application 115 to access and display particular results in which the user is interested. FIG. 7 illustrates two examples of graphical elements used to display results included in test information 140. Method 900 ends in block 990.

Method 900 includes elements 901-990. While these elements are shown in a particular order for ease of understanding, other orders may be used. In various embodiments, some of the method elements may be performed concurrently, in a different order than shown, or may be omitted. Additional method elements may also be performed as desired. For example, the client computing system may issue a particular request as part of sub-block 912, while receiving a response for a previously issued request as a part of sub-block 916.

Figure 10:
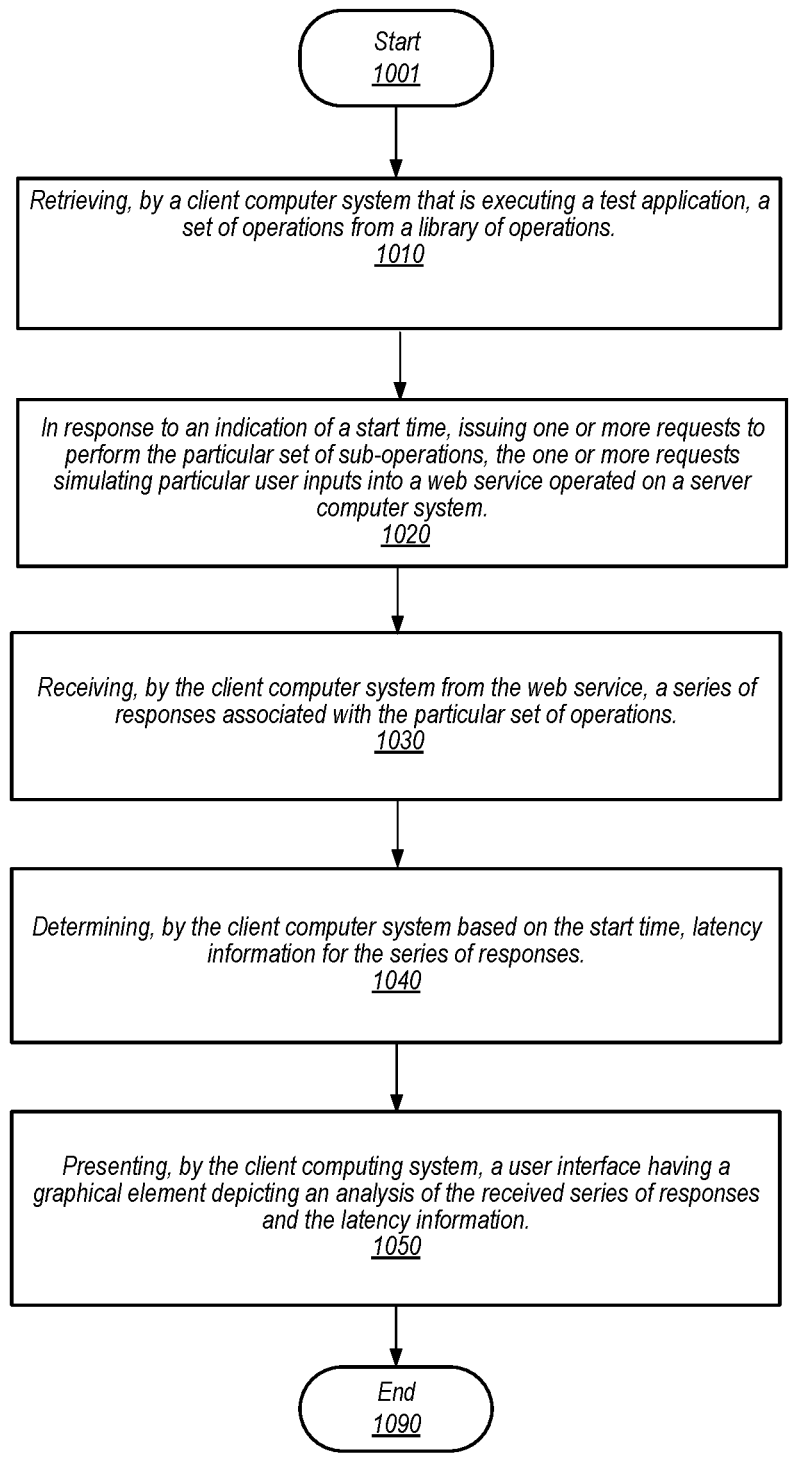
FIG. 10 is a flow diagram depicting another example method for testing a web service, according to some embodiments.

Proceeding now to FIG. 10, another method for testing a web service is illustrated. In a similar manner as method 900 above, method 1000 may be implemented by any of the web server test systems shown in FIGS. 1-4. Client computing system 105 may, in some embodiments, include (or have access to) a non-transitory, computer-readable medium having program instructions stored thereon that are executable by client computing system 105 to cause the operations described with reference to FIG. 10. Referring collectively to the web service test systems of FIGS. 1 and 4, and the flow diagram of FIG. 10, method 1000 begins at block 1001.

Method 1000 includes, at block 1010, retrieving, by a testing application executing on a client computing system, an operation from a library of operations, the selected operation including a particular set of sub-operations. As illustrated in FIG. 4, test application 115 retrieves an operation from test library 403 stored in database 401. Test library 403 includes a plurality of operations that include one or more sub-operations. The operations included in test library 403 may be utilized to simulate a variety user inputs to one or more types of web services, including, for example, login operations, search requests, web page navigation, text input operations, and the like. Test application 115 is configured to select one or more operations and issue one or more requests associated with performing the selected operation on a web service being tested.

At block 1020, method 1000 includes, in response to an indication of a start time, issuing one or more requests to perform the particular set of sub-operations, the one or more requests simulating particular user inputs into a web service operated on a server computing system. Referring to FIG. 1, client computer system 105 issues requests 125a-125c to cause web service 103 to perform sub-operations 122a-122c of selected operation 120. In some embodiments, web service 103 includes a search engine and operation 120 is a web search using a portion of a search term. The particular set of sub-operations 122a-122c include: entering the portion of the search term into a dialog box; sending the portion of the search term to one or more search databases; and collecting search results from each of the one or more search databases. In a different embodiment, operation 120 is a login to an account on web service 103, and sub-operations 122a-122c may include: sending account credentials from client computing system 105; validating the account credentials by web service 103; and sending a response to client computing system 105 to acknowledge that the credentials were successfully validated.

Method 1000 further includes, at block 1030, receiving, by the client computing system from the web service, a series of responses associated with the particular set of operations. Client computing system 105 may responses using various techniques. In some embodiments, web service 103 may include a test mode. The test mode causes web service 103 (e.g., by enabling a particular test process within web service 103) to collect one or more metrics associated with the performance of sub-operations 122a-122c. Web service 103 includes the collected metrics in responses sent to client computing system 105. In other embodiments, web service 103 utilizes one or more processes performed by client computing system 105. Client computing system 105 observes and records messages sent between the portion of web service 103 executing on server computing system 101 and the portion of web service 103 executed on client computing system 105. It is contemplated that, in some embodiments, a combination of techniques may be used to receive the series of responses.

At block 1040, method 1000 also includes, determining, by the client computing system based on the start time, latency information for the series of responses. Client computing system 105, as shown in FIG. 1, determines latency information 133a-133c based on an amount of time elapsing between sending one of requests 125a-125c to web service 103, and receiving a corresponding one of responses 135a-135c. If, as described in regards to block 1030, a test process is used for collection of some test metrics, then latency information is determined by the test process and sent to client computing system 105 as part of a corresponding response. Client computing system 105 indexes the latency information with one or more additional metrics, such as a test iteration number, an identifier of a corresponding sub-operation, data input used for the sub-operation, results of the sub-operation, and other similar information.

Furthermore, at block 1050 method 1000 includes, presenting, by the client computing system, a user interface having a graphical element depicting an analysis of the received series of responses and the latency information. Client computing system 105 includes user interface 150 for selecting and presenting an analysis of selected portions of the collected test information 140. By utilizing user interface 150, a user may select one or more iterations of performances of particular operations and/or sub-operations. Corresponding test results may be averaged together on a single graphical element (e.g., results chart 701 in FIG. 7) or displayed on adjacent charts (e.g., timelines 803*a* and 803*b* in FIG. 8) for comparison. The user may utilize the results to implement program fixes or enhancements for a revision of web service 103. Method 1000 ends in block 1090.

Figure 11:
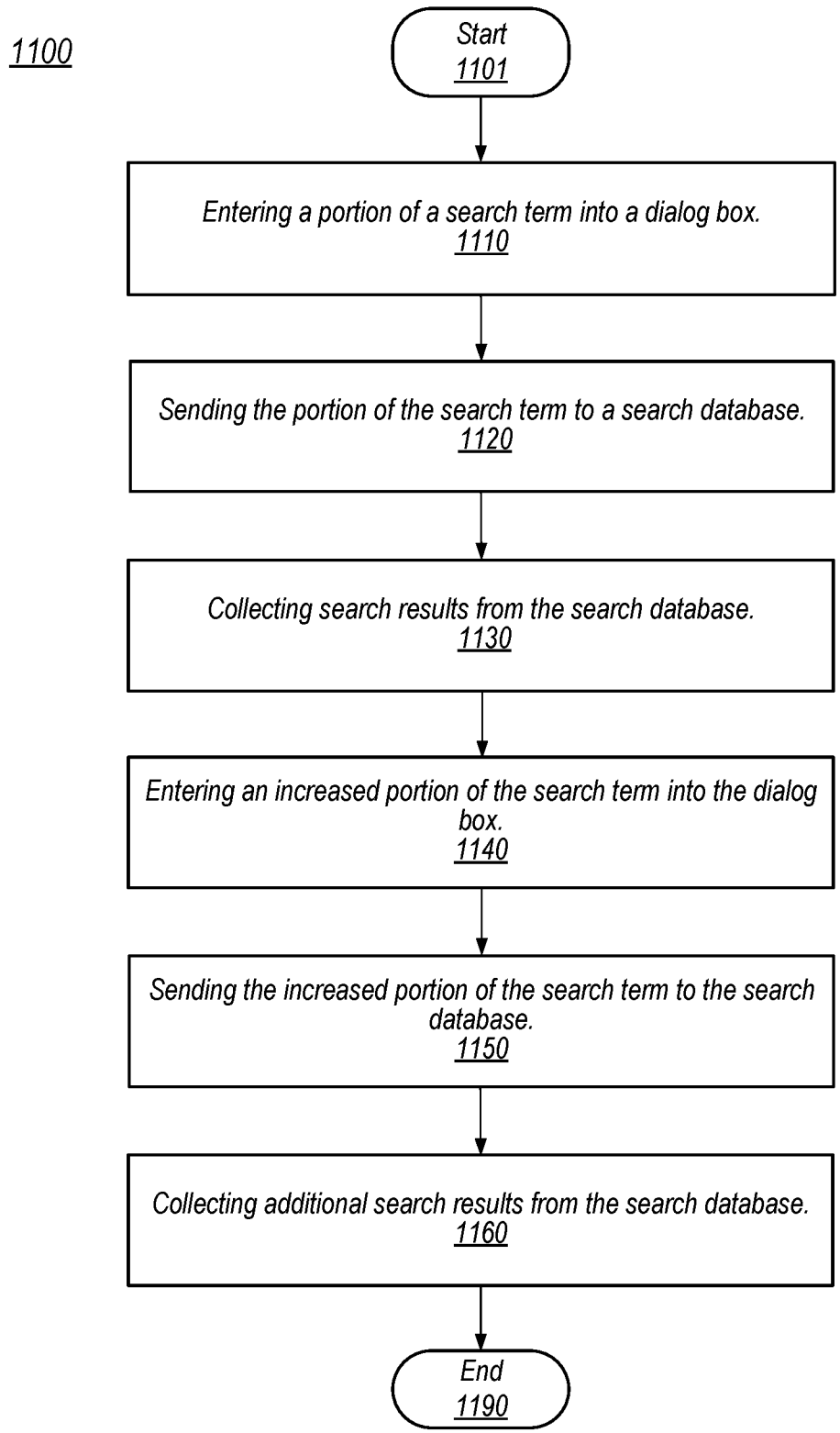
FIG. 11 is a flow diagram illustrating an example method for testing a web-based search engine, according to some embodiments.

Moving to FIG. 11, a method for testing a web service that includes a search engine is depicted. Method 1100, in a similar fashion as methods 900 and 1000 above, may be implemented by any of the web server test systems shown in FIGS. 1-4. For example, client computing system 105 may retrieve program instructions from a non-transitory, computer-readable medium having the program instructions stored thereon that are executable by client computing system 105 to cause the operations described with reference to FIG. 11. Referring collectively to FIGS. 1, 4, and 11, method 1100 begins at block 1101 to perform a search operation on a web service that includes a search engine.

Method 1100, at block 1110, includes entering a portion of a search term into a dialog box. Testing application 115, executing on client computer system 105, causes a search operation to be performed by web service 103 running, at least partially, on server computing system 101. A first sub-operation of the search operation is performed by entering a portion of a search term. For example, if the search term is "enterprise," then the portion may correspond to "ent." Client computing system 105 causes the letters "ent" to be entered into a dialog box generated by web service 103.

At block 1120, method 1100 further includes sending the portion of the search term to a search database. As a second sub-operation, web service 103 receives the portion of the search term and selects one or more databases to search. The portion of the search term is sent to the selected database(s) to initiate the search. Databases may be selected based on input from client computing system 105, stored preferences associated with an active account, a determination based on the received portion of the search term, or a combination of any suitable methods.

At block 1130, method 1100 also includes collecting search results from the search database. The one or more selected databases send, as a third sub-operation, identifying information to web service 103 corresponding to each suitable matched item in a respective database. The received results are collected by web service 103 and sent to client computing system 105. Client computing system 105 records the received search results along with an indication of the portion of the search term used to generate the recorded results. In addition, client computing system 105 includes latency information corresponding to an amount of time from web service 103 sending the portion of the search term to the selected database(s) to sending the results to client computing system 105. Other metrics may also be collected and recorded with the search results and latency information, such as a test iteration number identifying a particular performance of the search operation. The recorded and indexed results are stored as a part of test information 140.

Method 1100 further includes, at block 1140, entering an increased portion of the search term into the dialog box. Client computing system 105 repeats the performance of the search operation using an increased portion of the search term. Accordingly, client computing system 105 repeats the first sub-operation by entering an increased portion of the search term, e.g., "ente" or "enter," into the dialog box generated by web service 103.

Method 1100 also includes, at block 1150, sending the increased portion of the search term to the search database. Web service 103 repeats the second sub-operation of the search operation by sending the increased portion of the search term to the selected database(s). In some embodiments, repeating the search operation may include causing web service 103 to select one or more different databases as compared to the database(s) used in block 1120.

Continuing at block 1160, method 1100 includes collecting additional search results from the search database. To repeat the third sub-operation, results returned from the selected one or more databases are collected and recorded by client computing system 105. The recorded results are again indexed and added to test information 140. Desired portions of the recorded test information may be accessed and displayed, utilizing a user interface as described above. The method ends at block 1190.

Figure 12:
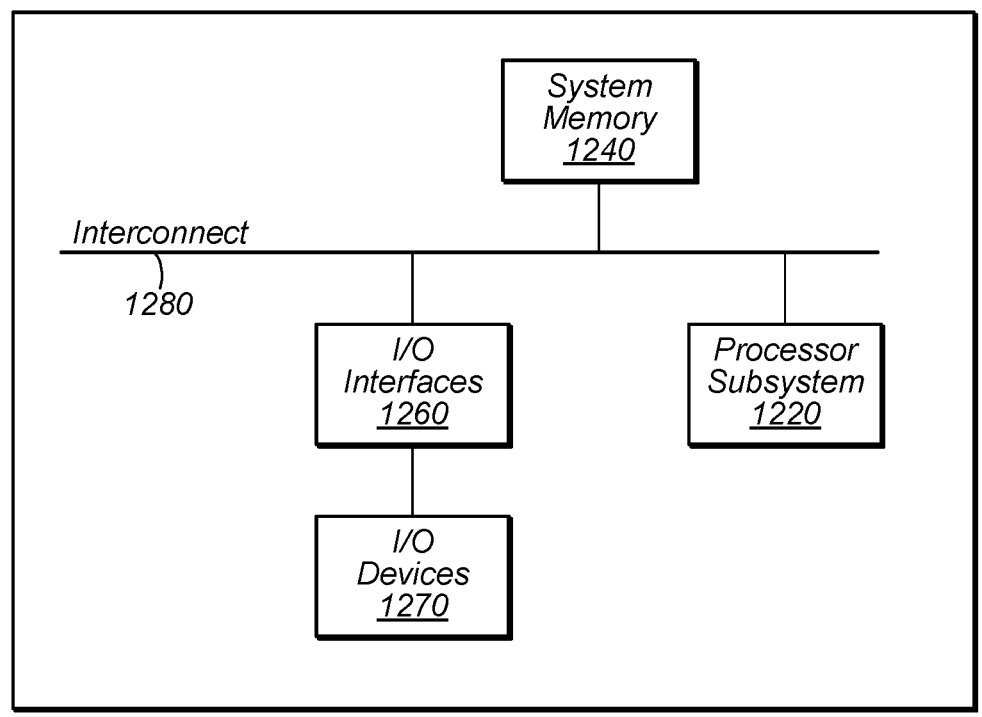
FIG. 12 is a block diagram showing an example computing system, according to some embodiments.

Referring now to FIG. 12, a block diagram of an example computing system 1200 is depicted, which may implement one or more computer systems, such as server computing system 101 and/or client computing system 105 of FIG. 1, according to various embodiments. Computing system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computing system 1200 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computing system 1200 is shown in FIG. 12 for convenience, computing system 1200 may also be implemented as two or more computer systems operating together.

Processor subsystem 1220 may include one or more processors or processing units. In various embodiments of computing system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause computing system 1200 to perform various operations described herein. System memory 1240 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computing system 1200 is not limited to primary storage such as system memory 1240. Rather, computing system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over WiFi, Bluetooth, Ethernet, etc.), and computing system 1200 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something; intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., modules 222*a*-222*d*). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
receiving, by a web service executing on a server computer system, a request, from a client computing system, to perform a test operation by the web service, wherein the web service includes a plurality of modules, and wherein the request includes a plurality of sub-operations, one or more of which is not visible to the client computing system;
enabling, by the web service, a test controller in the server computer system;
assigning, by the test controller, ones of the plurality of sub-operations to respective ones of the plurality of modules;
recording, by the test controller, test information associated with the ones of the plurality of modules based on performance of the respective sub-operations, wherein the test information includes latency information for performance of at least one of the one or more sub-operations; and
sending, by the test controller to the client computing system, the recorded test information, wherein the recorded test information includes references to the plurality of sub-operations and respective ones of the modules.

2. The method of claim 1, wherein the requested test operation includes a single operation that includes the plurality of sub-operations.

3. The method of claim 2, further comprising determining, by the test controller, the plurality of sub-operations that comprise the single operation.

4. The method of claim 1, further comprising producing, by one or more of the respective modules based on performance of the respective sub-operations, intermediate results that are provided to the test controller, but not to the client computing system.

5. The method of claim 1, further comprising activating, by the server computer system, the test controller in response to the request.

6. The method of claim 1, further comprising activating, by the server computer system, the test controller in place of a production controller in response to an earlier request from the client computing system to enter a test mode.

7. The method of claim 6, further comprising sending, by the server computer system, code for a portion of the test controller to the client computing system.

8. The method of claim 1, wherein the test operation includes a web search using a particular search phrase; and
wherein the plurality of sub-operations includes performing a plurality of web searches using different portions of the particular search phrase as a respective search term for ones of the sub-operations.

9. A non-transitory computer-readable medium having computer instructions stored thereon that are capable of being executed by a server computer system to cause operations comprising:
operating a web service that includes a plurality of modules for performing respective sub-operations included in a given operation;
receiving a request from a client computer system to perform a test operation by the web service;
assigning, using a test controller included in the server computer system, ones of the plurality of modules to perform respective ones of a plurality of sub-operations associated with the test operation, wherein performance of one or more of the plurality of sub-operations is not visible to the client computing system;
recording, using the test controller, test information indicative of performance of the respective sub-operations, wherein the test information includes latency information for performing at least one of the sub-operations; and
providing the recorded test information to the client computer system, wherein the recorded test information includes references to the associated sub-operations and the respective ones of the assigned modules.

10. The non-transitory computer-readable medium of claim 9, further comprising producing, by one or more of the respective modules based on performance of the respective sub-operations, intermediate results that are provided to the test controller, but not to the client computing system.

11. The non-transitory computer-readable medium of claim 9, further comprising activating the test controller in response to the request.

12. The non-transitory computer-readable medium of claim 9, further comprising activating the test controller in place of a production controller in response to an earlier request from the client computer system to enter a test mode.

13. The non-transitory computer-readable medium of claim 9, further comprising sending code for a portion of the test controller to the client computer system.

14. The non-transitory computer-readable medium of claim 9, wherein the test operation includes a web search using a particular search phrase; and
wherein the plurality of sub-operations includes performing a plurality of web searches using different portions of the particular search phrase as a respective search term for ones of the sub-operations.

15. A method, comprising:
operating, by a server computer system, a web service that includes a plurality of modules assigned by a production controller to perform respective sub-operations included in a given operation received from a client computer system;
receiving, by the server computer system from the client computer system, a request to perform a test operation by the web service;
in response to the receiving, copying, by the server computer system to the client computer system, code for a test controller;
assigning, using the copied test controller code, ones of the plurality of modules to perform respective ones of a plurality of sub-operations associated with the test operation, wherein the production controller is excluded from the assigning;
recording, using the copied test controller code, test information indicative of performance of the respective sub-operations, wherein the test information includes latency information for performing at least one of the sub-operations; and presenting, using the copied test controller code, the recorded test information on the client computer system, wherein the recorded test information includes references to the associated sub-operations and the respective assigned modules.

16. The method of claim 15, wherein the assigning includes selecting, by the copied test controller code, the plurality of sub-operations from a set of sub-operations available in the web service.

17. The method of claim 15, wherein an intermediate result between the plurality of modules and the production controller is not sent to the client computer system when the production controller assigns respective sub-operations; and wherein an intermediate result between the plurality of modules and the test controller code is sent to the client computer system when the test controller code assigns respective sub-operations.

18. The method of claim 15, wherein presenting the recorded test information includes sending the recorded test information to a test application executing on the client computer system.

19. The method of claim 15, wherein presenting the recorded test information includes generating one or more timelines indicating a respective start time and a respective stop time for ones of the plurality of modules to perform the respective sub-operations.

20. The method of claim 15, wherein the test operation includes a web search using a particular search phrase; and wherein the plurality of sub-operations includes performing a plurality of web searches using different portions of the particular search phrase as a respective search term for ones of the sub-operations.

* * * * *